United States Patent
Raz

(10) Patent No.: US 10,817,309 B2
(45) Date of Patent: Oct. 27, 2020

(54) RUNTIME OPTIMIZATION OF CONFIGURABLE HARDWARE

(71) Applicant: Next Silicon Ltd, Tel Aviv (IL)

(72) Inventor: Elad Raz, Ramat Gan (IL)

(73) Assignee: Next Silicon Ltd, Tel Aviv (IL)

( * ) Notice: Subject to any disclaimer, the term of this patent is extended or adjusted under 35 U.S.C. 154(b) by 182 days.

(21) Appl. No.: 16/053,382

(22) Filed: Aug. 2, 2018

(65) Prior Publication Data

US 2019/0042282 A1 Feb. 7, 2019

Related U.S. Application Data

(60) Provisional application No. 62/540,849, filed on Aug. 3, 2017, provisional application No. 62/558,090, filed on Sep. 13, 2017.

(51) Int. Cl.
*G06F 9/44* (2018.01)
*G06F 15/78* (2006.01)
*G06T 1/20* (2006.01)
*G06F 9/445* (2018.01)

(52) U.S. Cl.
CPC ...... *G06F 9/44505* (2013.01); *G06F 15/7867* (2013.01); *G06T 1/20* (2013.01)

(58) Field of Classification Search
CPC .... G06F 9/44505; G06F 15/7867; G06T 1/20
See application file for complete search history.

(56) References Cited

U.S. PATENT DOCUMENTS

| | | | |
|---|---|---|---|
| 5,321,806 A | 6/1994 | Meinerth et al. | |
| 5,367,653 A | 11/1994 | Coyle et al. | |
| 5,933,642 A * | 8/1999 | Greenbaum | G06F 8/447 712/1 |
| 6,347,346 B1 | 2/2002 | Taylor | |
| 6,871,341 B1 * | 3/2005 | Shyr | G06F 8/4441 712/227 |
| 7,269,174 B2 | 9/2007 | Olson et al. | |
| 8,156,307 B2 | 4/2012 | Wallach et al. | |
| 8,230,176 B2 | 7/2012 | Li | |
| 8,275,973 B2 | 9/2012 | Toi et al. | |
| 8,504,778 B2 | 8/2013 | Kim | |
| 8,589,628 B2 | 11/2013 | Kim | |
| 8,621,151 B2 | 12/2013 | Kim | |
| 8,656,114 B2 | 2/2014 | Kim | |
| 8,767,501 B2 | 7/2014 | Joshi et al. | |

(Continued)

FOREIGN PATENT DOCUMENTS

| WO | WO 2019/028253 | 2/2019 |
|---|---|---|
| WO | WO 2019/055675 | 3/2019 |

OTHER PUBLICATIONS

International Search Report and Written Opinion of International Searching Authority for PCT/US2018/045008, ISA/RU, Moscow, Russia, dated Nov. 15, 2018.

(Continued)

*Primary Examiner* — Stefan Stoynov

(57) ABSTRACT

A method for runtime optimization of a configurable processing architecture are disclosed. The method comprises receiving a plurality of calls for running at least one function; identifying at least one pattern among the plurality of received calls; and based on the at least one pattern, manipulating at least a portion of the configurable processing architecture, to compute the least one function.

17 Claims, 7 Drawing Sheets

(56) References Cited

U.S. PATENT DOCUMENTS

| | | |
|---|---|---|
| 8,874,847 B2 | 10/2014 | Kim |
| 8,949,550 B2 | 2/2015 | Choi et al. |
| 9,317,437 B2 | 4/2016 | Kim |
| 9,348,756 B2 | 5/2016 | Kim |
| 9,385,715 B2 | 7/2016 | Singh |
| 9,460,012 B2 | 10/2016 | Pricopi et al. |
| 9,563,401 B2 | 2/2017 | Chaudhuri et al. |
| 9,588,773 B2 | 3/2017 | Nicol et al. |
| 9,590,629 B2 | 3/2017 | Nicol |
| 9,692,419 B2 | 6/2017 | Melton et al. |
| 10,503,524 B2 * | 12/2019 | Nicholson ............ G06F 11/3058 |
| 2004/0190477 A1 | 9/2004 | Olson et al. |
| 2005/0265258 A1 | 12/2005 | Kodialam et al. |
| 2006/0242288 A1 | 10/2006 | Masurkar |
| 2006/0294150 A1 | 12/2006 | Stanfill et al. |
| 2007/0220522 A1 | 9/2007 | Coene et al. |
| 2009/0055596 A1 | 2/2009 | Wallach et al. |
| 2009/0319754 A1 | 12/2009 | Toi et al. |
| 2010/0332761 A1 | 12/2010 | Li |
| 2011/0099562 A1 | 4/2011 | Nandy et al. |
| 2011/0213950 A1 | 9/2011 | Mathieson et al. |
| 2012/0131277 A1 | 5/2012 | Kim |
| 2012/0131284 A1 | 5/2012 | Kim |
| 2012/0137072 A1 | 5/2012 | Kim |
| 2012/0137119 A1 | 5/2012 | Doerr et al. |
| 2012/0183294 A1 | 7/2012 | Boertjes et al. |
| 2012/0284379 A1 | 11/2012 | Zievers |
| 2013/0024621 A1 | 1/2013 | Choi et al. |
| 2013/0227222 A1 | 8/2013 | Kim |
| 2014/0025881 A1 | 1/2014 | Joshi et al. |
| 2014/0223110 A1 | 8/2014 | Kim |
| 2015/0046660 A1 | 2/2015 | Kim |
| 2015/0234744 A1 | 8/2015 | Pricopi et al. |
| 2015/0261682 A1 | 9/2015 | Kim |
| 2015/0268963 A1 | 9/2015 | Etsion et al. |
| 2015/0381508 A1 | 12/2015 | Goodson et al. |
| 2016/0098367 A1 | 4/2016 | Etsion et al. |
| 2016/0140259 A1 | 5/2016 | Ponamgi |
| 2016/0342396 A1 | 11/2016 | Kukolich et al. |
| 2017/0277550 A1 * | 9/2017 | Zhang ................. G06F 11/3024 |
| 2018/0189063 A1 | 7/2018 | Fleming et al. |
| 2019/0004994 A1 | 1/2019 | Fleming et al. |
| 2019/0005161 A1 | 1/2019 | Fleming et al. |
| 2019/0007332 A1 | 1/2019 | Fleming et al. |
| 2019/0018815 A1 | 1/2019 | Fleming et al. |

OTHER PUBLICATIONS

International Search Report and Written Opinion of International Searching Authority for PCT/US2018/050910, ISA/RU, Moscow, Russia, dated Feb. 14, 2019.

International Preliminary Report on Patentability dated Feb. 13, 2020 From the International Bureau of WIPO Re. Application No. PCT/US2018/045008. (6 Pages).

International Search Report and the Written Opinion dated Feb. 14, 2019 From the International Searching Authority Re. Application No. PCT/US2018/050910. (6 Pages).

International Search Report and the Written Opinion dated Nov. 15, 2018 From the International Searching Authority Re. Application No. PCT/US2018/045008. (6 Pages).

Hartenstein, "A Decade of Reconfigurable Computing: a Visionary Retrospective", CS Department (Informatik), University of Kaiserslautern, Germany, pp. 1-8.

International Preliminary Report on Patentability dated Mar. 26, 2020 From the International Bureau of WIPO Re. Application No. PCT/US2018/050910. (6 Pages).

Official Action dated Apr. 2, 2020 from the US Patent and Trademark Office Re. U.S. Appl. No. 16/130,716. (32 pages).

* cited by examiner

RUNTIME OPTIMIZATION OF CONFIGURABLE HARDWARE

CROSS-REFERENCE TO RELATED APPLICATIONS

This application claims the benefit of US Provisional Application No. 62/540,849 filed on Aug. 3, 2017 and US Provisional Application No. 62/558,090 filed Sep. 13, 2017, the contents of which are hereby incorporated by reference.

TECHNICAL FIELD

The disclosure generally relates to runtime optimization of hardware, and more specifically to techniques for runtime optimization of configurable hardware.

BACKGROUND

As technology advances, the need for stronger processing systems with higher processing power rapidly increases. These days, processors are expected to deliver high computational throughput and are highly power efficient. Nevertheless, existing processing systems execute sequential streams of instructions that communicate through explicit storage and, therefore, suffer from the model's power inefficiencies.

In modern processing architectures, each dynamic instruction must be fetched and decoded, even though programs mostly iterate over small static portions of the code. Furthermore, because explicit state memory is the only channel for communicating data between instructions, intermediate results are transferred repeatedly between the functional units and the register files. The limitations of modern computing architectures include high power consumption, heat dissipation, network and I/O bottlenecks, and memory partitions.

For example, a field-programmable gate array (FPGA) operates on software-configured hardware circuits. The FPGA allows very high throughput rates with low latency. The configurability of the FPGA can be used as co-processors in multi-core architectures or be placed in critical data paths to offload processing for a system's CPU. One of the main disadvantages of FPGAs is the lack of flexible programmability. Further, the computing power of a FPGA is relatively low.

An example of a programmable processing architecture is a multicore processor. The architecture of a multicore processor includes a single computing component with two or more independent actual processing units ("cores"), which are units that read and execute program instructions. The instructions are ordinary CPU instructions (e.g., add, move data, and branch). In this architecture, a single processor can run multiple instructions on separate cores in parallel. The main disadvantages of multicore processors are high power consumption and low throughput.

Another example of a processing architecture is a graphics processing unit (GPU). A GPU is based on a parallel architecture consisting of thousands of smaller, more efficient cores designed for handling multiple tasks simultaneously. GPUs can be utilized to accelerate computing tasks of deep-learning, graphics rendering, and machine learning applications. The main disadvantages of GPUs are high power consumption and latency. Furthermore, GPU has no memory coherency and therefore shared memory comprises a challenge.

Thus, it would be advantageous to provide a processing architecture that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The various aspects of the disclosed embodiments include a method for runtime optimization of a configurable processing architecture. The method comprising: receiving a plurality of calls for running at least one function; identifying at least one pattern among the plurality of received calls; and based on the at least one pattern, manipulating at least a portion of the configurable processing architecture, to compute the least one function.

The various aspects of the disclosed embodiments further include a configurable processing architecture. The system comprising a computing grid; a processing unit; a memory connected to the processing circuitry, wherein the memory contains instructions that, when executed by the processing unit, configure the processing unit to: receive a plurality of calls for running at least one function; identify at least one pattern among the plurality of received calls; and based on the at least one pattern, manipulate a computing grid, in the configurable processing architecture, to compute the least one function.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1A:
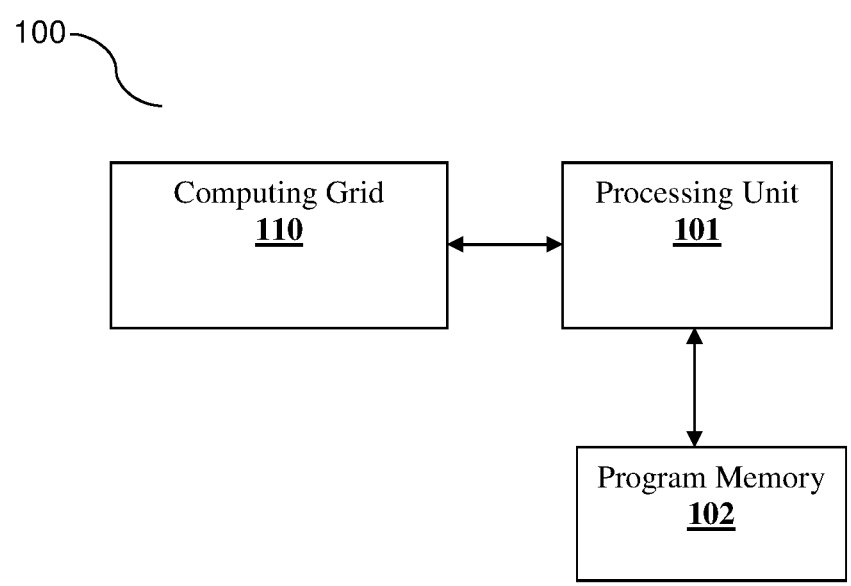
FIG. 1A is a schematic diagram of a configurable processing architecture according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1A illustrates an example schematic diagram of a configurable processing architecture 100 in accordance with an embodiment. The processing architecture 100 includes a computing grid 110 and a processing unit (circuitry) 101 coupled to a memory, such as a program memory 102.

The processing unit 101 is configured to run a process for optimizing an execution of a portion of program code on the computing grid 110. A portion of the program code may include a function, a basic-block, or both (collectively referred to as a function). A basic-block is a piece of program code with consecutive instructions such that there is no jump from or to the middle of the block.

In an embodiment, the configurable processing architecture 100 is configured to accelerate the operation of computational devices. For example, such a device may include a multi-core central processing unit (CPU), a field-programmable gate array (FPGA), a graphics processing unit (GPU), an application-specific integrated circuit (ASIC), a quantum computer, optical computing, a neural-network accelerator or combination thereof.

According to the disclosed embodiments, the acceleration is achieved by, for example, executing functions over the computing grid 110 instead of over a computational device (not shown). The computing grid 110 includes an array of logical elements and multiplexers (MUXs) as further discussed herein below with reference to FIG. 1B.

Execution of a function by the computing grid 110 is performed by projecting, using a projection graph, the function to a computation group. A computation group is a set of logical elements connected via MUXes in the grid 110. By correctly allocating and selecting the logical elements in the grid 110, an optimized execution of functions may be achieved.

Specifically, the computing grid 110 is configured by the processing unit 101, in part, to optimize the operation of the grid 110. To this end, the processing unit 101 performs a number of optimization processes.

In an embodiment, the processing unit 101 is configured to receive a plurality of calls for functions running by computational elements in the computational device. The calls may be to a plurality of different functions, to the same function, or both; to different portions of the memory, the same portions of the memory, or both; and so on. The functions may perform computational operations including, but not limited to, arithmetic, logic operations, or both.

The processing unit 101 is configured to identify at least one pattern among the plurality of received calls. According to another embodiment, the identification can be made by an external process and thereafter forwarded to the processing unit 101. In an embodiment, the patterns are incurrences of two or more functions in association above a certain predetermined threshold. The threshold may be dynamically changed over time, based on certain statistical analysis of the re-occurrence of certain functions, and so on. That is, when, for example, two functions are being executed one after another relatively frequently, a pattern of an association between the two functions is determined.

Based on the determined pattern, the processing unit 101 configures or otherwise manipulates the computing grid 110 to optimize execution of the function. The manipulation of the function may be achieved through a number of processes including, but not limited to, a duplication, an expand, a shrink, an in-lining, a modify, or a combination thereof, and so on.

In an example embodiment, when performing a relocation process, the processing unit 101 configures the computing grid 110 such that two computation groups that often call each other are allocated topologically close to each other in the grid 110.

In another embodiment, the processing unit 101 configures the computing grid 110 such that a set of computation groups that have been often used will be duplicated to many instances. In a further embodiment, computation groups callers load-balance among the new duplicated computation groups.

In yet another embodiment, when performing an in-lining process, the processing unit 101 configures the computing grid 110 such that two logical computation groups that often call each other are configured and reconfigured as a single logical computation group that combines the two-logical computation groups.

In yet another embodiment, when performing an expand process, the processing unit 101 configures the computing grid 110 such that a logical computation group containing branches and loops are reconfigured with the loop unrolled using in-lining and relocation processes.

In yet another embodiment, when performing a shrinking process, the processing unit 101 configures the computing grid 110 such that a duplicated or expanded computational group, which no longer provides with an optimized execution, will be reconfigured out. Callers of the shrink computational groups are referenced to different computational groups. Once there are no references, a computational group can be reconfigured out. That is, the resources associated with that computational group can be released.

It should be noted that the processing unit 101 configures the computing grid 110 to achieve better performance according to needs with respect to at least one of: power consumption, memory access, latency, gate usage count, and throughput.

The processing unit 101 may be realized as one or more hardware logic components and circuits. For example, and without limitation, illustrative types of hardware logic components that can be used include general-purpose microprocessors, microcontrollers, a multi-core CPU, an FPGA, a GPU, an ASIC, a quantum processor, an optical computing processor, a neural-network accelerator, a coarse-grained configurable architecture (CGRA), an intelligence processing unit, and the like, or any other hardware logic components that can perform calculations or other manipulations of information. In some embodiments, the target computational device to be accelerated serves as the processing unit 101.

In some embodiments, analysis of critical pieces of code including functions that are memory bound is performed. Such functions are mapped to computation groups that are relocated close to a memory of the computational device. Such analysis may also be applicable for I/O related operations. For example, operations on network ports, storage, PCI-e, video sensors, and so on.

Figure 1B:
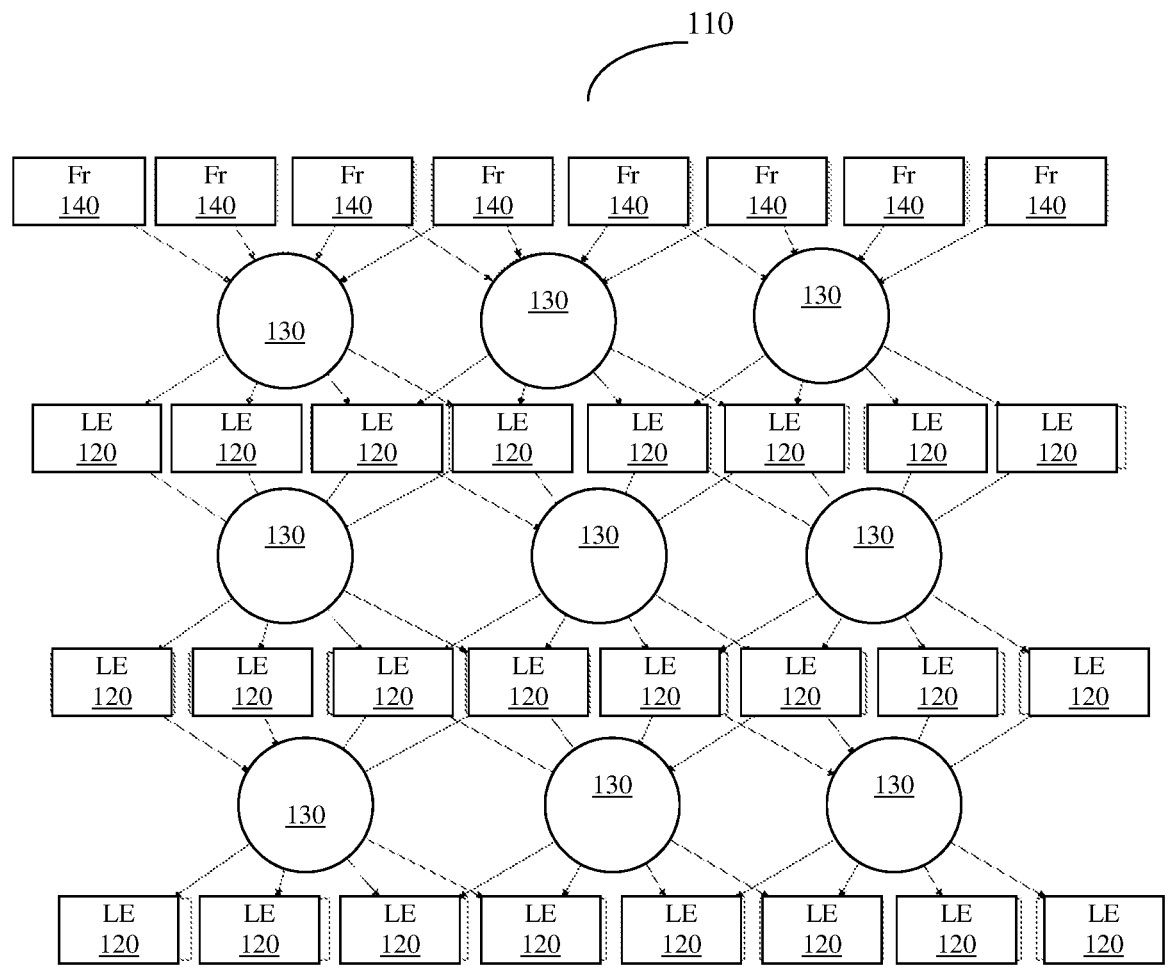
FIG. 1B is a schematic diagram of a computing grid of the configurable processing architecture according to an embodiment.

Referring now to FIG. 1B, in an example implementation, the computing grid 110 includes a plurality of logical elements 120 (collectively referred to as LEs 120 or individually as a LE 120). In an embodiment, a LE 120 may be a logical operator, such as AND, OR, NOT, XOR, or a combination thereof. In yet another embodiment, a LE 120 may be configured to perform a lookup table (LUT) operation. In yet another embodiment, a LE 120 may be configured to perform a high-level arithmetic function, such as a fixed point or floating-point number addition, subtraction, multiplication, division, exponent, and the like. In yet another embodiment, a LE 120 may perform a shift operation, such as a shift left, a shift right, and so on.

It should be noted that each LE 120 in the computing grid 110 can be configured with any of the operational functions discussed above. In some configurations, a first group of the LEs 120 may perform a first operation (e.g., a logical operator), a second group of the LEs 120 may perform another operation (e.g., a shift operation), and so on. In certain configurations, all LEs 120 may perform the same operation functions.

In an embodiment, the computing grid 110 further includes a plurality of data routing junctions 130, such as multiplexers, de-multiplexers, switches and so on (collectively referred to as MUXs 130 or individually as a MUX 130). The MUX 130 is configured to route data to and from the LEs 120.

The computing grid 110 is composed of a plurality of computation groups. Each computation group includes N-by-M LEs 120 connected via a single MUX 130. The values of 'N' and 'M' are integer numbers that may be different or equal. In an embodiment, M is equal to N minus 1 (M=N−1). The MUX 130 connects the LEs 120 from two adjacent rows in the computing grid 110.

In an embodiment, each MUX 130 includes a plurality of registers (not shown) to maintain literal values. The MUX 130 is further configured with a condition, a connection table, and the code of the operation to be performed. The MUXs 130 are configured by the processing unit 101 via a bus (not shown).

In another embodiment, the computing grid 110 includes a mesh network of feeders (Frs) 140, serving as data input mesh network. The feeders 140 are configured to feed inputs (for example, but not limited to, functions' parameters) for processing by the LEs 120. In an embodiment, the feeders 140 are realized as internal chip interconnections (ICIs).

It should be appreciated that the manipulation of the computing grid 110 is performed in real-time, simultaneous to the operation of the target computational device to be accelerated. According to an embodiment, the manipulation may further include moving one or more functions to different execution devices, i.e., a determination can be made that a function is not needed in an accelerator such that it is relocated to be executed in a CPU.

It should be further appreciated that the LEs 120, MUXs 130, and feeders 140 may be implemented in hardware, software, firmware, or any combination thereof. In an exemplary embodiment, the computing grid 110 (and its various elements) is implemented as a semiconductor device. In another embodiment, the computing grid 110 is implemented in part as a semiconductor device, and in part as software, firmware or a combination thereof. As an example, logic paths determined to be more-likely or more occurring may be implemented on a semiconductor device, while logic paths determined to be less-likely or rarely-occurring may be implemented in software. It should be noted that such embodiment may reach lower overall expected-value costs, e.g., in run time, power consumption, etc., than other embodiments relying on homogeneous implementation. The logic paths can be detected by the processing unit 101 or by a dedicated hardware element in the computing grid 110.

Figure 2A:
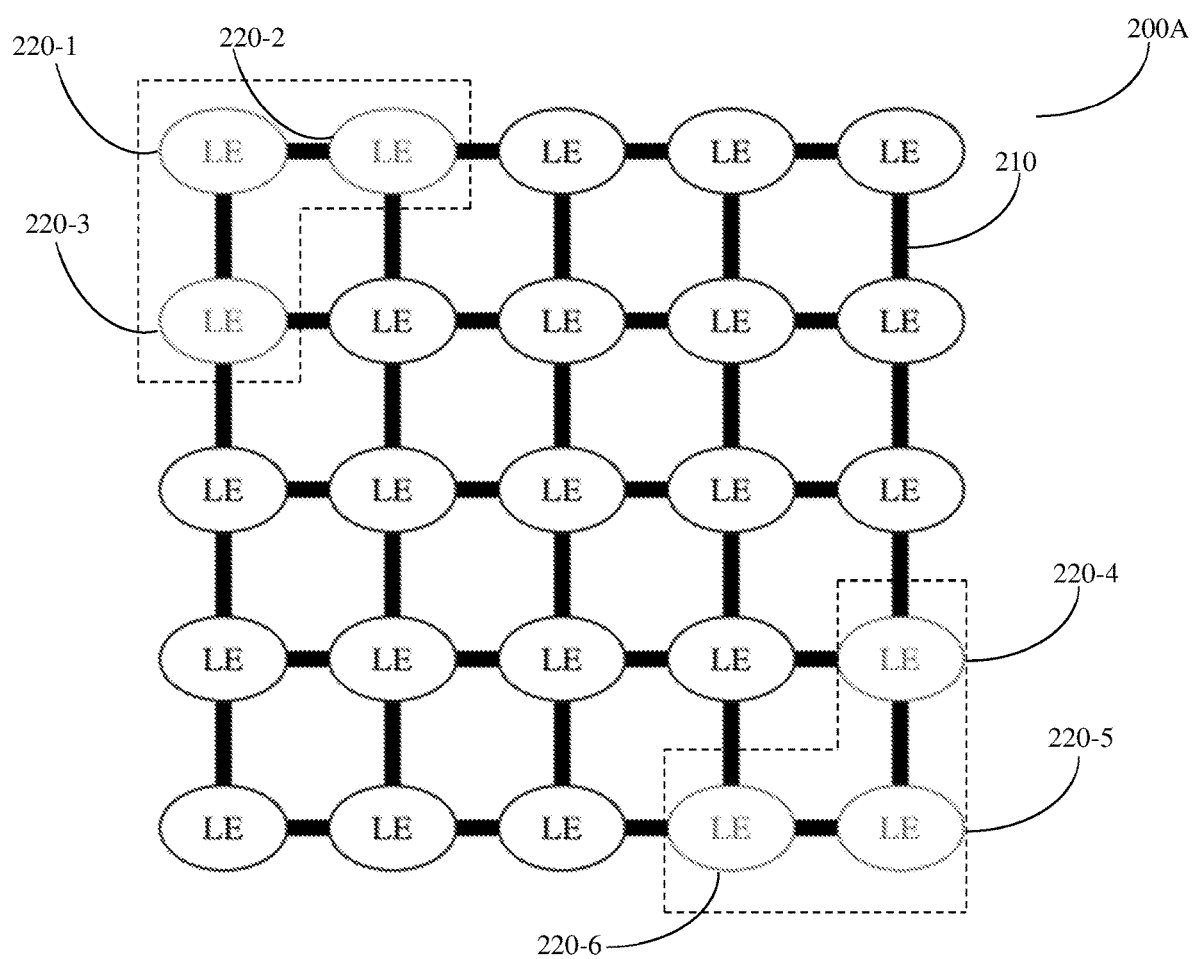
FIGS. 2A through 2D are schematic simulations showing identification of patterns and configuration of functions respective thereof according to an embodiment.
Figure 2B:
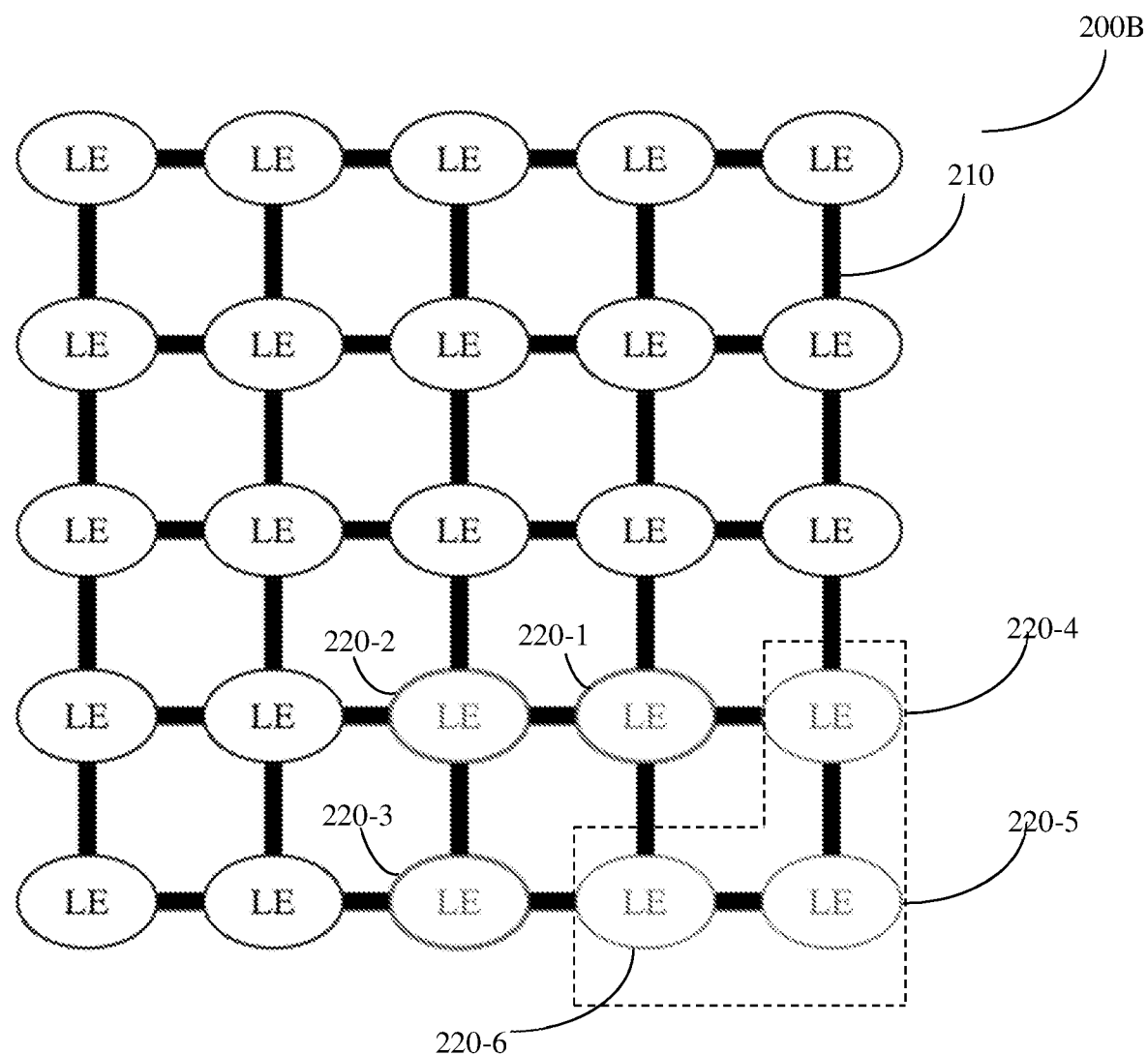

FIGS. 2A and 2B are example simulations 200A and 200B, respectively, of relocation of certain functions according to an embodiment. The relocation process includes configuration or manipulation of a computing grid, such that two logical computation groups (such as basic-blocks or functions) that often call each other will be located physically closer to each other in the computing grid.

In the example simulations shown in FIGS. 2A and 2B, a computing grid 210 is shown having a plurality of LEs 220-1 through 220-N, where N is an integer greater than or equal to 1 (no MUXs are included in the grid 210, merely to simplify the drawings). The computation groups are mapped or projected to respective LEs 220 based on a projection graph. Upon identification that a computation group including the LEs 220-1, 220-2 and 220-3, is associated with a computation group including the LEs 220-4, 220-5 and 220-6, the computation group including the LEs 220-1, 220-2 and 220-3 are relocated in proximity to the computation group including the LEs 220-4, 220-5 and 220-6 as shown in FIG. 2B.

Figure 2C:
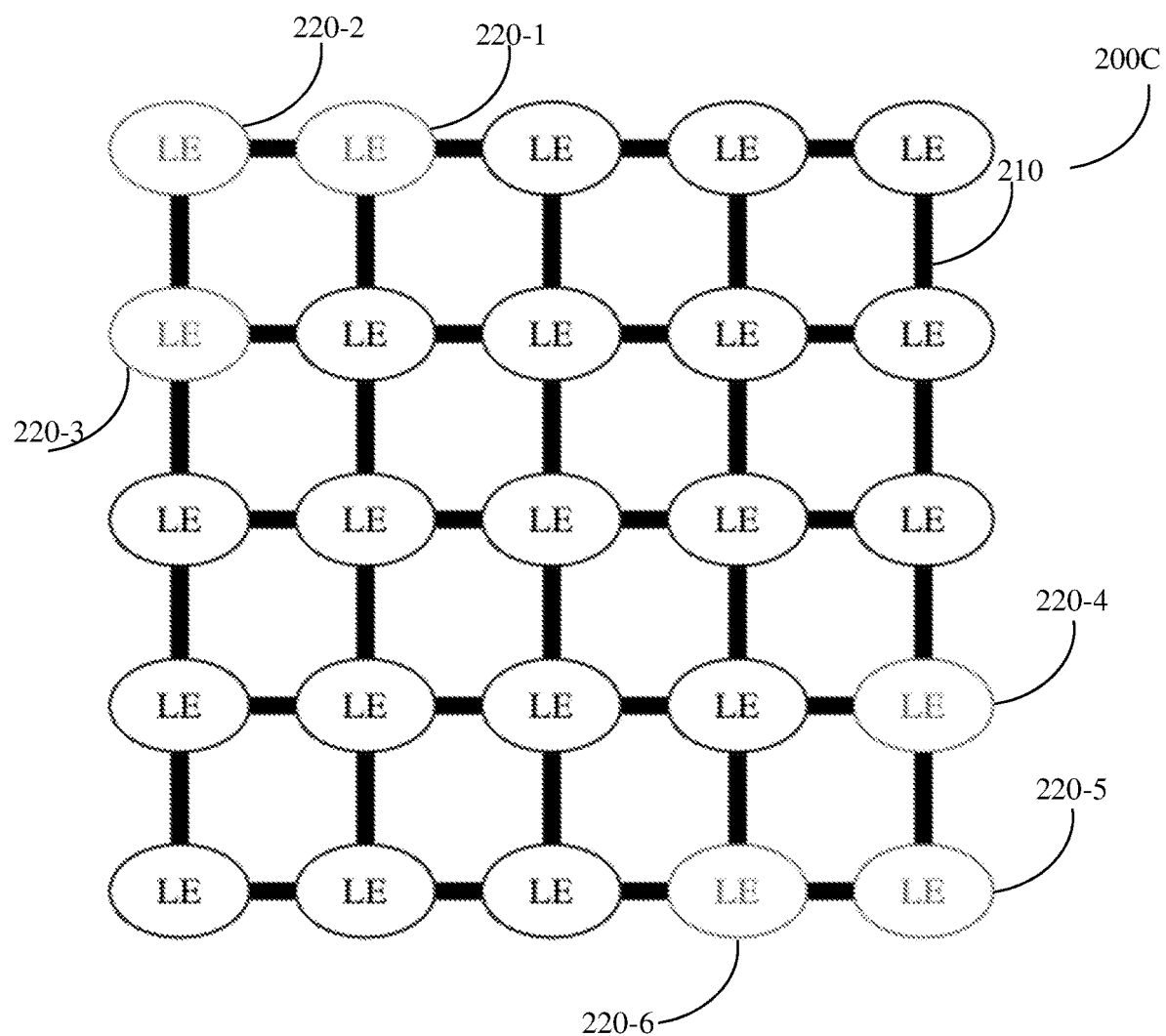
Figure 2D:
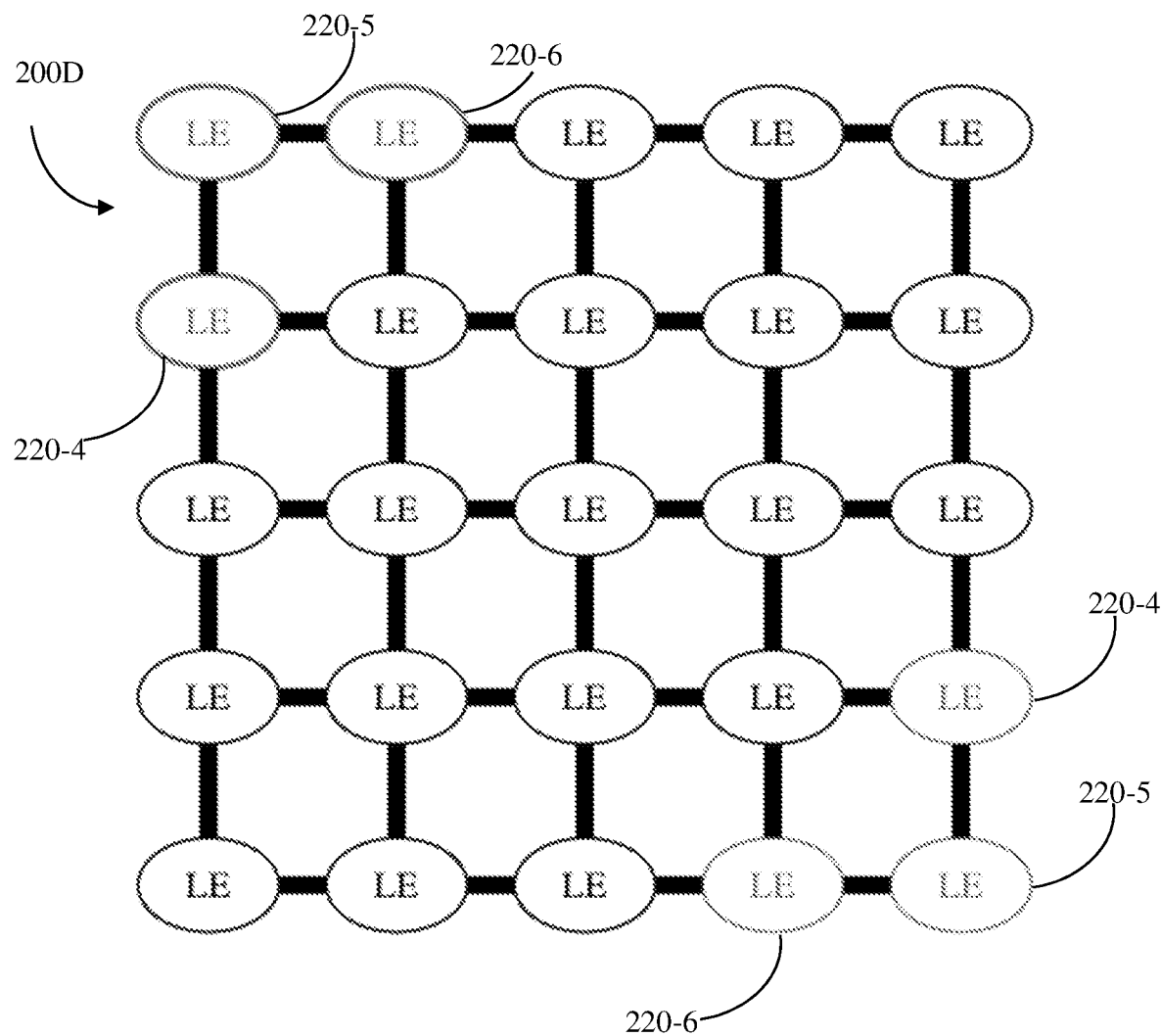

FIGS. 2C and 2D are example simulations 200C and 200D, respectively, of duplication of certain functions. The duplication process includes configuring the computing grid 210 such that the LEs 220 mapped to frequently called computation groups will be duplicated several times on the grid 210 to speed up calculation and open bottlenecks.

In an example embodiment, the duplication process may further include a load balancing process for the newly duplicated instances, for example, by reconfiguring the callers' references to the original block so that they will evenly call all duplications. As another example, the callers' references are reconfigured to the newly configurable MUX that load balances the duplications.

When it is determined that the computing grid 210 can be optimized by duplicating a computation group of a function which is frequently called, each such group is duplicated and relocated far away from the original group. In the example shown in FIGS. 2C and 2D, a computation group including the LEs 220-4, 220-5 and 220-6, is duplicated. The duplicated group is located far away from the LEs of the original group on the computing grid 210 to enhance the call to such functions. This is demonstrated in FIG. 2D, which includes a duplicated group in comparison to the arrangement shown in FIG. 2C. The duplicated group may replace groups of functions which are called less frequently relative to other groups. Alternatively, the manipulation may include shrinking, or a de-duplication process, when a duplicated logical computation element is identified as not needed for performance and therefore removed from the grid.

Figure 3:
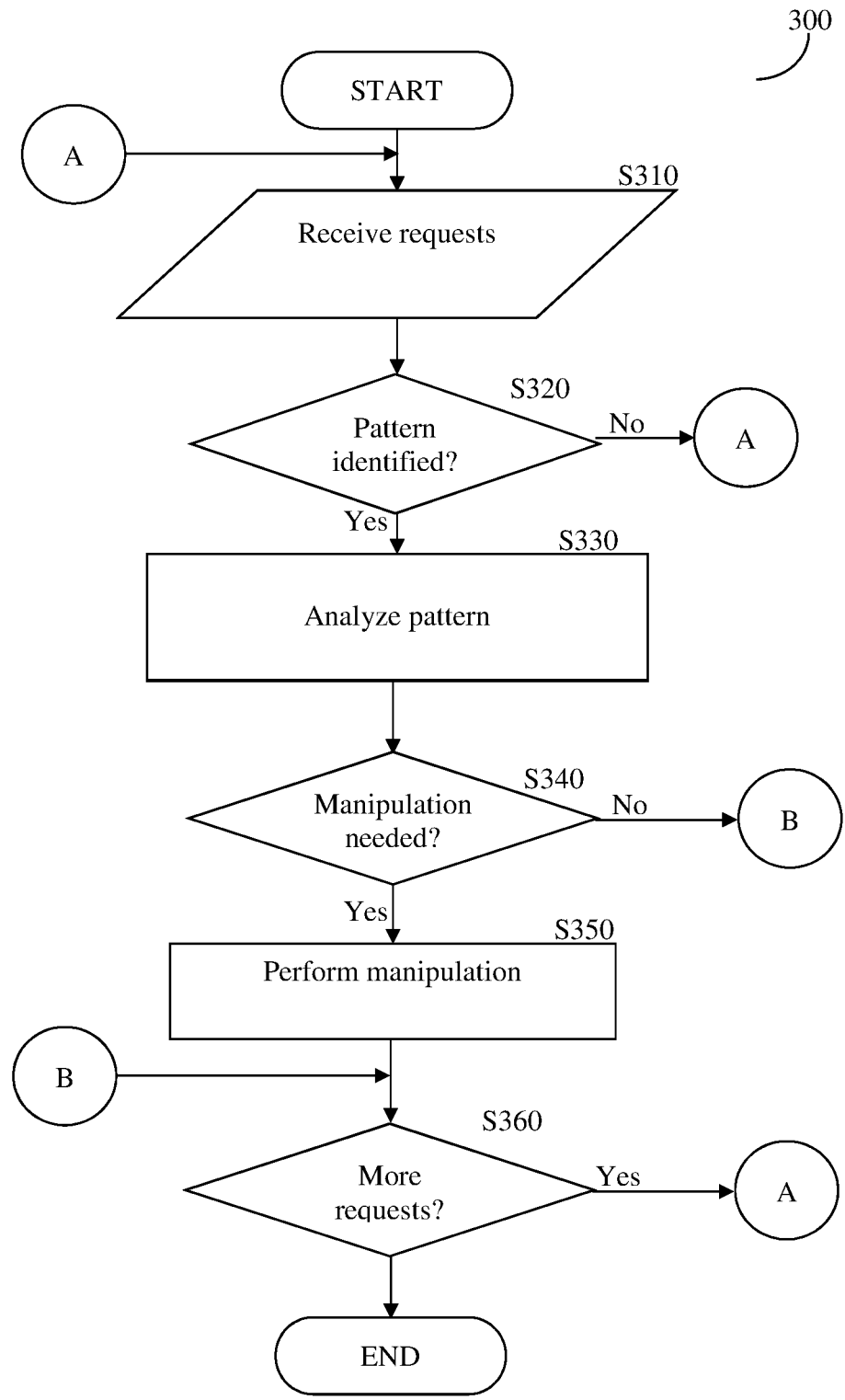
FIG. 3 is a flowchart of runtime optimization of configurable hardware according to an embodiment.

FIG. 3 shows an example flowchart 300 illustrating a method for runtime optimization of a computing grid operable in a configurable processing architecture according to an embodiment. At S310, a plurality of requests for running at least one function are received. The requests may be calls received via an interface to perform operations. As an example, the requested operations may be s memory load, for example, from a program memory (e.g., the program memory 102, FIG. 1B).

At S320, the received system calls are analyzed to check whether at least one pattern is identified among two or more of the system calls. The identification may be of calls received in sequence or calls that have not been received in sequence. As an example, a pattern may indicate that two functions are performed one after the other. If such a pattern is identified, execution continues with S330; otherwise, execution returns to S310.

At S330, the identified pattern is analyzed to determine if a modification or reconfiguration of the computing grid is required. For example, the analysis may include determining if, for example, there is a computation group in the grid that was already allocated to perform a function indicated in the pattern. As another example, the analysis may include determining if the pattern indicates re-occurrence of functions. As another example, the analysis may determine if the pattern indicates that one function calls another function.

At S340, based on the analysis, it is checked whether manipulation of the computing grid is required. If so, execution continues with S350; otherwise, execution continues with S360.

At S350, the computing grid is modified or otherwise re-configured so as to optimize the functions called by the received calls. Various examples for processes that can be performed as part of the modification or reconfiguration of the computing grid are discussed above.

At S360, it is checked whether additional requests have been received, and if so, execution continues with S310; otherwise, execution terminates.

The embodiments disclosed herein can be implemented as hardware, firmware, software, or any combination thereof. The application program may be uploaded to, and executed by, a machine comprising any suitable architecture. Preferably, the machine is implemented on a computer platform having hardware such as one or more central processing units ("CPUs"), a memory, and input/output interfaces.

The computer platform may also include an operating system and microinstruction code. The various processes and functions described herein may be either part of the microinstruction code or part of the application program, or any combination thereof, which may be executed by a CPU, whether or not such computer or processor is explicitly shown.

In addition, various other peripheral units may be connected to the computer platform such as an additional network fabric storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for runtime optimization of a configurable processing architecture, comprising:
   receiving a plurality of calls for running at least one function, where each of the plurality of calls is directed to a computational device for computing each of the at least one function thereon;
   identifying at least one pattern among the plurality of calls;
   based on the at least one pattern, manipulating at least a portion of the configurable processing architecture comprising a computing grid to compute the at least one function, where the computing grid includes:
   a data input mesh network;
   a plurality of logical elements; and
   a plurality of multiplexers, wherein the plurality of logical elements and the plurality of multiplexers form at least one computation group, wherein at least one of the logical elements and at least one of the plurality of multiplexers forms each of the at least one computation group; and
   computing the at least one function by the computing grid instead of the computational device.

2. The method of claim 1, wherein the computational device is any one of:
   a multi-core central processing unit (CPU), a field-programmable gate array (FPGA), a graphics processing unit (GPU), a coarse-grained configurable architecture (CGRA), an intelligence processing unit (IPU), a neural-network accelerator, an application-specific integrated circuit (ASIC), and a quantum computer.

3. The method of claim 1, wherein each of the at least one of function is mapped for computation by at least one of the at least one computation group.

4. The method of claim 1, wherein the manipulation of the computing grid further comprises:
   duplicating one of the at least one computation group mapped to a function when the pattern indicates re-occurrence of the function.

5. The method of claim 1, wherein the at least one computation group includes a first computation group and a second computation group, wherein the at least one function includes a first function and a second function, wherein the manipulation of the computing grid further comprises:
   relocating the first computation group and the second computation group respectively mapped to the first function and the second function based on the pattern.

6. The method of claim 1, wherein the manipulation of the computing grid further comprises:
   releasing a computation group when no calls for a function are mapped to the computation group.

7. The method of claim 1, wherein the data input mesh network includes at least one feeder.

8. The method of claim 1, wherein the manipulation is performed at runtime.

9. A configurable processing architecture, comprising:
   a computing element, wherein the computing element includes at least one of: a computing grid, and a processing unit;
   a memory connected to the processing unit, wherein the memory contains instructions that, when executed by the computing element, configure the configurable processing architecture to:
   receive a plurality of calls for running at least one function, where each of the plurality of calls is directed to a computational device for computing each of the at least one function thereon;
   identify at least one pattern among the plurality of calls;
   based on the at least one pattern, manipulate at least a portion of the configurable processing architecture comprising the computing grid, to compute the at least one function, where the computing grid includes:
   a data input mesh network;
   a plurality of logical elements; and
   a plurality of multiplexers, wherein the plurality of logical elements and the plurality of multiplexers form at least one computation group, wherein at least one of the logical elements and at least one of the plurality of multiplexers forms each of the at least one computation group; and
  computing the at least one function by the computing grid instead of the computational device.

10. The configurable processing architecture of claim 9, wherein the computing element is any one of: a multi-core central processing unit (CPU), a field-programmable gate array (FPGA), a graphics processing unit (GPU), a coarse-grained reconfigurable architecture (CGRA), a neural-network accelerator, an intelligence processing unit (IPU), an application-specific integrated circuit (ASIC), and a quantum computer.

11. The configurable processing architecture of claim 9, wherein each of the at least one of function is mapped for computation by at least one of the at least one computation group.

12. The configurable processing architecture of claim 9, wherein the manipulation of the computing element further comprises:
  duplicating one of the at least one computation group mapped to a function when the pattern indicates re-occurrence of the function.

13. The configurable processing architecture of claim 9, wherein the at least one computation group includes a first computation group and a second computation group, wherein the at least one function includes a first function and a second function, wherein the manipulation of the computing element further comprises:
  relocating a first computation group and second computation group respectively mapped to a first function and second function, respective of the pattern.

14. The configurable processing architecture of claim 9, wherein the manipulation of the computing element further comprises:
  releasing a computation group when no calls for a function are mapped to the computation group.

15. The configurable processing architecture of claim 9, wherein the data input mesh network includes at least one feeder.

16. The configurable processing of claim 9, wherein the manipulation is performed at runtime.

17. A non-transitory computer readable medium having stored thereon instructions for causing a processing unit to execute a process for runtime optimization of a configurable processing architecture, the process comprising:
  receiving a plurality of calls for running at least one function, where each of the plurality of calls is directed to a computational device for computing each of the at least one function thereon;
  identifying at least one pattern among the plurality of calls; and
  based on the at least one pattern, manipulating at least a portion of the configurable processing architecture comprising a computing grid, to compute the least one function, where the computing grid includes:
    a data input mesh network;
    a plurality of logical elements; and
    a plurality of multiplexers, wherein the plurality of logical elements and the plurality of multiplexers form at least one computation group, wherein at least one of the logical elements and at least one of the plurality of multiplexers forms each of the at least one computation group; and
  computing the at least one function by the computing grid instead of the computational device.

* * * * *